(12) United States Patent
Kuboki

(10) Patent No.: US 6,498,871 B1
(45) Date of Patent: Dec. 24, 2002

(54) WAVELENGTH STABILIZED LIGHT SOURCE

(75) Inventor: Katsuhiko Kuboki, Komoro (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/662,645

(22) Filed: Sep. 15, 2000

(30) Foreign Application Priority Data

Jan. 21, 2000  (JP) ........................................ 2000-017733

(51) Int. Cl.$^7$ .............................. G02B 6/28; H04J 14/02
(52) U.S. Cl. ............................................ 385/24; 359/124
(58) Field of Search ............................ 385/24, 27, 39; 359/124, 127

(56) References Cited

U.S. PATENT DOCUMENTS

| | | | | |
|---|---|---|---|---|
| 5,361,154 A | * | 11/1994 | Nakata | 359/123 |
| 5,715,075 A | * | 2/1998 | Tanaka et al. | 359/128 |
| 5,801,861 A | * | 9/1998 | Majima | 359/124 |
| 5,861,975 A | * | 1/1999 | Sakuyama et al. | 359/187 |
| 6,215,572 B1 | * | 4/2001 | Taneda | 359/177 |
| 6,229,631 B1 | * | 5/2001 | Sato et al. | 359/110 |

FOREIGN PATENT DOCUMENTS

| | | | |
|---|---|---|---|
| DE | 3509354 A1 | * | 9/1986 |
| JP | 10-209973 | | 8/1998 |

* cited by examiner

*Primary Examiner*—Georgia Epps
*Assistant Examiner*—William Choi
(74) *Attorney, Agent, or Firm*—Mattingly, Stanger & Malur, P.C.

(57) ABSTRACT

A problem of a disclosed technique is as follows. The present problem is to control wavelengths of light sources in each individual optical transmitters, based on a plurality of reference wavelengths with high accuracy by a wavelength division multiplexing optical transmitting apparatus. Means for solving the problem is as follows. A reference light source is capable of simultaneously or successively generating a plurality of reference wavelengths different from one another. These reference wavelengths are demultiplexed by an optical multiplexer, which in turn are inputted to optical transmitters respectively. In the optical transmitters, their own light-source wavelengths are respectively controlled so as to coincide with the input reference wavelengths or reach inherent or proper values at which differences in wavelength exist.

18 Claims, 6 Drawing Sheets

WAVELENGTH STABILIZED LIGHT SOURCE

BACKGROUND OF THE INVENTION

1. Field of the Invention

The present invention relates to a wavelength stabilized light source. The present invention relates particularly to a wavelength stabilized optical transmitting apparatus and an optical transmitting apparatus both having a plurality of light sources, wherein each of wavelengths employed in a wavelength division multiplexing optical communication system is controlled to a predetermined value.

2. Description of the Related Art

With abrupt growth of the recent information communication market, an optical transmitter-receiver apparatus or system capable of transmitting a larger quantity of information has actively been developed. The development of a wavelength division multiplexing optical transmitter-receiver system capable of making a leap increase in the information amount per optical fiber becomes pronounced in particular. However, since a limitation is imposed on a wavelength region suitable for transmission executed with a transmission loss less reduced at each optical fiber. It is necessary to increase a number of optical channels for optical or light signals within the limited wavelength region. It is necessary to narrow the interval between adjacent wavelengths of each individual light signals for the purpose of increasing the number of optical channels. A problem arises in that a semiconductor laser principally used as a light source for a conventional wavelength division multiplexing optical transmitting apparatus or system greatly varies in wavelength according to changes in ambient temperature and drive current.

Further, a phenomenon has widely been known wherein even if the ambient temperature of the semiconductor laser is kept constant and the drive current is also held constant, the wavelength varies due to a variation with time such as a change in composition of the semiconductor laser if it is used over a long period. There is a possibility that such a variation in wavelength from each set value will cause interference from other light signals, a substantial degradation in transmission quality or a fall into an impossible-to-transmit state. It is therefore essential that an optical transmitter is provided with some wavelength monitoring mechanism and wavelength tunable mechanism to perform control for correcting a shift or deviation made from each set wavelength with a view toward implementing a high-density wavelength division multiplexing optical transmission system capable of narrowing a wavelength-to-wavelength interval.

As the optical transmitting apparatus provided with the wavelength monitoring mechanism and the wavelength tunable mechanism, an optical wavelength division multiplexing transmitting apparatus shown in FIG. 9 is known (see Japanese Patent Application Laid-Open No. Hei 10-209973, for example). Namely, optical or light signals 9 through 12 having wavelengths $\lambda 1$, $\lambda 2$, $\lambda 3$ and $\lambda 4$ different from one another, which are sent from optical transmitters 1 through 4, are respectively applied to an optical multiplexer or an optical coupler 300 through optical fibers 5, 6, 7 and 8, where they are multiplexed into a wavelength division-multiplexed signal 310, which in turn is applied to an optical power divider 305 through an optical fiber 304. The wavelength division-multiplexed signal 310 is divided into two by the optical power divider 305, one of which is sent to a wavelength deviation detector 302 as a wavelength division-multiplexed signal 311 through an optical fiber 307, and the other of which is transmitted through an optical fiber 306.

The wavelength deviation detector 302 generates deviations equivalent to differences between values of wavelengths included in the wavelength division-multiplexed signal 311 and the set values of the wavelengths assigned to the optical transmitters in advance, and sends their deviation signals 313 to a wavelength control circuit 301 on a time-sharing basis. The wavelength control circuit 301 and the optical transmitters 1 through 4 are respectively connected to one another through wires 321 and 324. The wavelength control circuit 301 generates wavelength control signals 331 through 334 for controlling the values of the wavelengths of the present signals to the values of the wavelengths assigned in advance, based on the respective deviation signals inputted to the wavelength control circuit 301. For example, signals for controlling the temperatures of light sources in the optical transmitters 1 through 4 or signals for controlling drive currents of the light sources are used as the wavelength control signals 331 through 334. The wavelength control signals 331 through 334 are distributed to the optical transmitters 1 through 4 through the wires 321 through 324 respectively. The optical transmitters 1 through 4 respectively control the wavelengths of their own light sources according to the wavelength control signals 331 through 334 and send out the wavelengths assigned to their own optical transmitters in advance.

SUMMARY OF THE INVENTION

A mechanism for identifying each individual light signals included in wavelength division-multiplexed light signals and measuring the values of wavelengths of the light signals is essential to the aforementioned prior art.

For example, intensity modulation is slightly effected on each of light signals sent out from within each individual optical transmitters, based on low-frequency signals different from an information transmission region. The values of the frequencies of these low-frequency signals are respectively set to different values every optical transmitters, and a wavelength deviation detector performs phase sensitive detection with the frequencies of the respective low-frequency signals, whereby deviations corresponding to the differences between the wavelengths of each individual optical transmitters and the wavelengths assigned to the optical transmitters in advance can be detected. However, a problem arises in that the intensity modulation using such low frequencies is unnecessary for original information transmission and might be one cause of degradation in transmission quality.

As a mechanism for identifying other light signals and measuring wavelengths thereof, a system is also known wherein a wavelength deviation detector measures the wavelength of each light signal while successively scanning a band-pass wavelength variable filter or an optical power divider or the like, and measures deviations corresponding to the differences between the measured wavelengths of light signals and the wavelengths assigned to each individual optical transmitters in advance. However, a problem arises in that since no identifying information exists in each light signal itself, it is not possible to correct each wavelength when the wavelength of the optical transmitter 1, which is to be originally set as the wavelength $\lambda 1$, and the wavelength of the optical transmitter 2, which it to be originally set as the wavelength $\lambda 2$, are respectively replaced by $\lambda 2$ and $\lambda 1$ with respect to each other.

Since, in either case, all the optical transmitters and the wavelength deviation detector are elements which constitute an electrical control loop, there is a possibility that when one optical transmitter is replaced by another due to it trouble or malfunction, it will interfere with the operation of other normal optical transmitters.

Thus, a principal object of the present invention is to implement an optical transmitting apparatus capable of stabilizing wavelengths of each individual optical transmitters without superimposing signals other than information necessary for information transmission, i.e., signals dedicated for wavelength control on light signals respectively.

Another object of the present invention is to implement an optical transmitting apparatus capable of achieving the above object, and when a failure or malfunction occurs in any of respective optical transmitters, performing such wavelength control as not to exert an influence on other optical transmitters due to the replacement of the faulty optical transmitter by another.

In an optical transmitting apparatus of the present invention to achieve the above objects, control units for receiving other light signals used to control characteristics such as wavelengths, optical intensities, optical phases, etc. of light signals respectively sent from optical transmitters, from the outside the optical transmitters and controlling the respective optical transmitters based on the received signals are respectively provided inside the optical transmitters or provided adjacent to the optical transmitters. Namely, a reference light source (wherein the wavelengths of signals generated therefrom are different from those of the light signals transmitted from the optical transmitters. Further, the wavelengths of the generated light signals are regarded as sufficiently stable.) capable of simultaneously or successively generating a plurality of reference wavelength light signals, means for demultiplexing the respective reference wavelength light signals emitted from the reference light-source and inputting the demultiplexed reference wavelength light signals to the plurality of optical transmitters respectively, and a control unit for controlling light-source wavelengths so as to allow light-source wavelengths of the optical transmitters to coincide with the wavelengths of the reference wavelength light signals, corresponding to the corresponding optical transmitters, of the input respective reference wavelength light signals, or so as to reach inherent or proper values at which differences in wavelength exist, are provided for each optical transmitter.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DESCRIPTION OF THE PREFERRED EMBODIMENTS

Preferred embodiments of the present invention will hereinafter be described with reference to the accompanying drawings.

<Embodiment 1>

Figure 1:
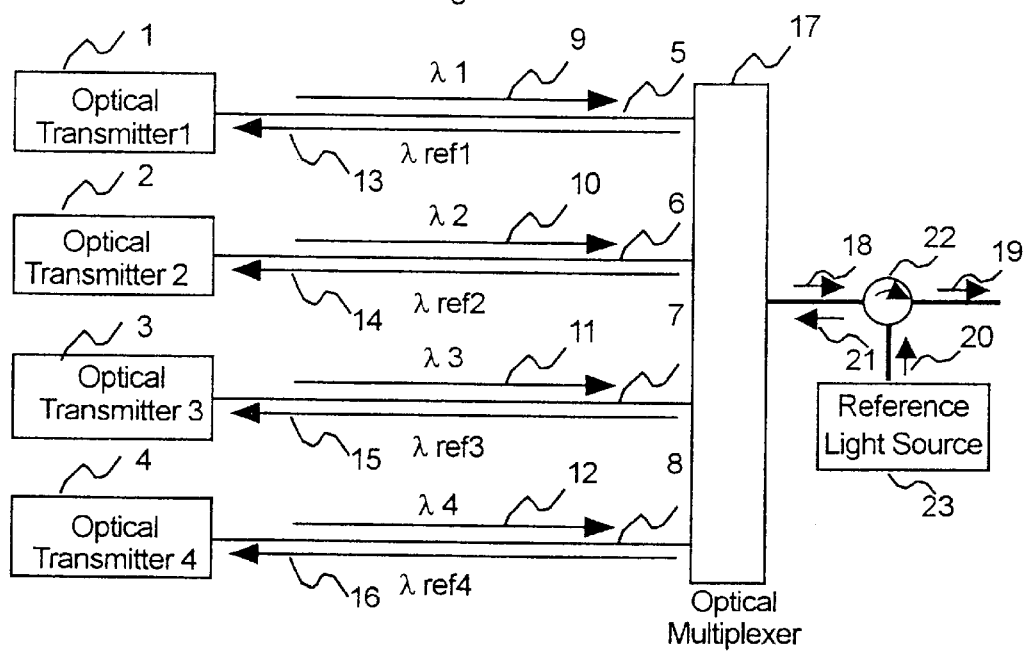
FIG. 1 is a diagram showing a configuration of an embodiment 1 of an optical transmitting apparatus according to the present invention.

FIG. 1 is a diagram showing a configuration of one embodiment of an optical transmitting apparatus according to the present invention. The optical transmitting apparatus according to the present embodiment includes a plurality of optical transmitters 1, 2, 3 and 4 for respectively generating light signals 9, 10, 11 and 12 having wavelengths $\lambda 1$ through $\lambda 4$ different from one another, optical fibers 5, 6, 7 and 8 for respectively transmitting the light signals 9, 10, 11 and 12, and an optical multiplexer 17 for combining the light signals 9, 10, 11 and 12 sent through the optical fibers 5 through 8 into one and converting it into a wavelength division-multiplexed signal 18. A reference light source 23 is provided outside the optical transmitters 1, 2, 3 and 4. Each of the optical transmitters 1, 2, 3 and 4 has a light source for generating a first light signal, and a control means or unit for controlling at least a wavelength of the characteristics of the first light signal by using the first light signal and a second light signal emitted from the reference light source 23.

In the above configuration, the optical multiplexer 17 comprises a Mach-Zehnder interferometer multiplexer, an arrayed waveguide multiplexer or the like. The output of the optical multiplexer 17 is connected to an optical circulator 22. The optical circulator 22 sends the wavelength division-multiplexed signal 18 with a low loss as a wavelength division-multiplexed signal 19 and transmits a reference wavelength light signal 20 emitted from the reference light source 23 with a low loss as a reference wavelength light signal 21. As the optical circulator 22, may be used an already-existing one which applies a Faraday effect of a magneto-optic crystal, for example.

A reference wavelength launched from an outgoing port of the optical multiplexer 17 is demultiplexed every wavelengths according to an optical demultiplexed characteristic reciprocal with a multiplexed characteristic of the optical multiplexer. The demultiplexed reference wavelength light signals 13 through 16 are respectively sent to the optical transmitters 1 through 4 through the optical fibers 5 through 8. The wavelengths of the demultiplexed reference wavelength light signals 13 through 16 are $\lambda \text{ref}1$ through $\lambda \text{ref}4$ respectively. The respective optical transmitters 1 through 4 cause light-source wavelengths in the optical transmitters to coincide with the wavelengths of the demultiplexed reference wavelength light signals 13 through 16 or perform such wavelength control as to fix the wavelengths with predetermined wavelength's offsets as viewed from the reference wavelength. The details of this operation will be described later with reference to FIG. 6. Owing to such wavelength control, the wavelengths of the light signals 9 through 12 sent from the optical transmitters 1 through 4 respectively result in wavelengths based on the reference wavelength emitted from the reference light source 23.

Incidentally, the reference wavelength light signals having the wavelengths λref1 through λref4 may be emitted simultaneously from the reference light source 23 or may be sent out in time sequence.

Figure 2:
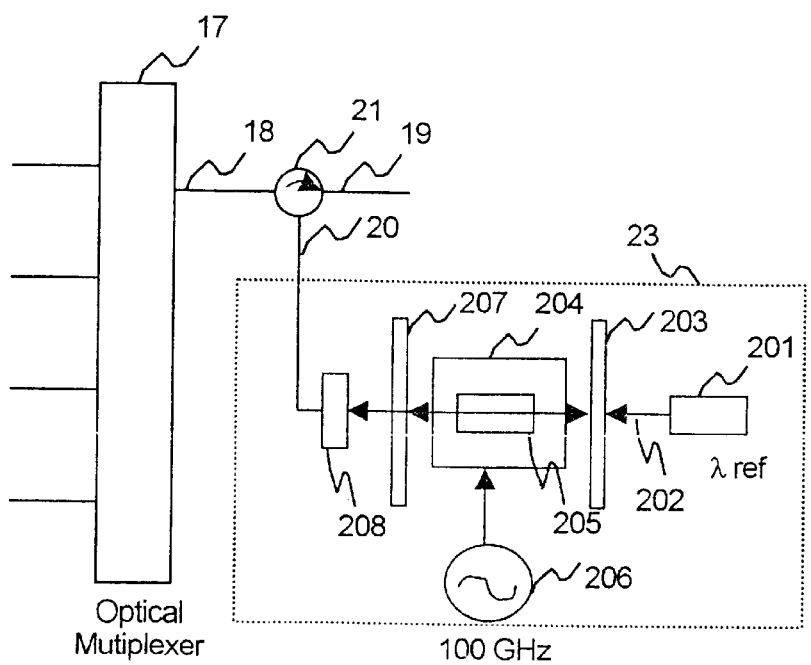
FIG. 2 is a configurational diagram for describing a reference light source employed in the embodiment 1 of the present invention.

FIG. 2 shows one example of a configuration of the reference light source 23 employed in the above-described embodiment. This example is a configuration similar to, for example, [Optical comb generator] described in [Wide-Span Optical Frequency Comb Generator for Accurate Optical Frequency Difference Measurement] of the paper IEEE Journal of Quantum Electronics, vol.29, p.2693–p.2701 in 1993.

A light signal 202 emitted from a light source 201 such as a semiconductor laser or the like whose wavelength is λref, is launched into a Fabry-Perot resonator comprising half mirrors 203 and 207. Further, a microwave cavity resonator 204 is placed inside the Fabry-Perot resonator. An optical frequency modulator comprised of an LiNbO$_3$ crystal is placed inside the microwave cavity resonator 204. A microwave is applied to the microwave cavity resonator 204 by a microwave oscillator 206. The microwave cavity resonator 204 is designed so as to resonate at a predetermined microwave frequency (100 GHz in the example of FIG. 2). The light signal 202 is subjected to optical frequency modulation even by the LiNbO$_3$ crystal when repeatedly multiple-reflected within the Fabry-Perot resonator.

As a result, the light signal transmitted through the half mirror 207 includes wavelengths spaced away from λref by wavelengths of an integral multiple of 100 GHz (=0.8 nm) to the long-wave and short-wave sides of λref except for the wavelength λref. The light signal transmitted therethrough is sent to the optical fiber 20 by a condenser lens 208.

Figure 3:
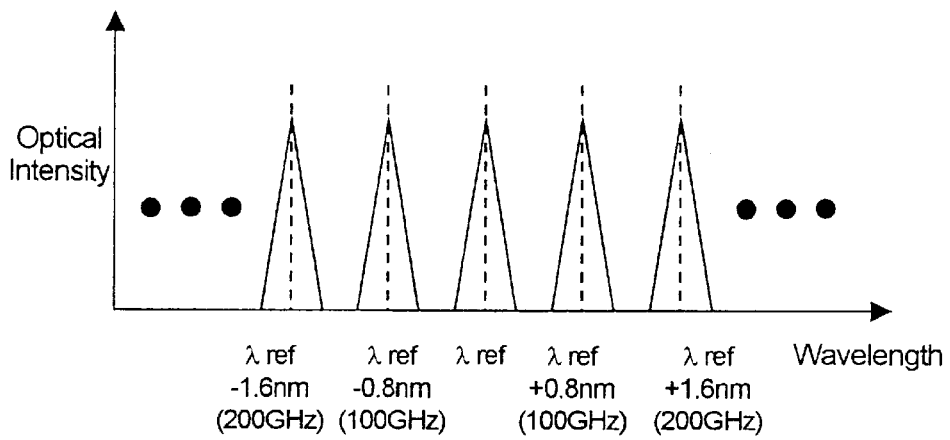
FIG. 3 is a diagram for describing an example of a signal outputted from the reference light source employed in the embodiment 1 of the present invention.

FIG. 3 shows the relationship between the wavelength and optical intensity of a light signal emitted from the light source 201 employed in the embodiment. Light signals are produced on the long-wave and short-wave sides of λref of the light source 201 at equal intervals with an oscillation frequency of the microwave oscillator. Thus, a plurality of reference wavelengths can be obtained simultaneously by making the oscillation frequency of the microwave oscillator identical to the wavelength interval of the wavelength division-multiplexed signal. Incidentally, the wavelength of the light source 201 is stabilized by an absolute optical frequency stabilized circuit using a resonant spectral line of an atom or molecule. Thus, all the wavelengths shown in FIG. 3 can also be stabilized simultaneously.

<Embodiment 2>

Figure 4:
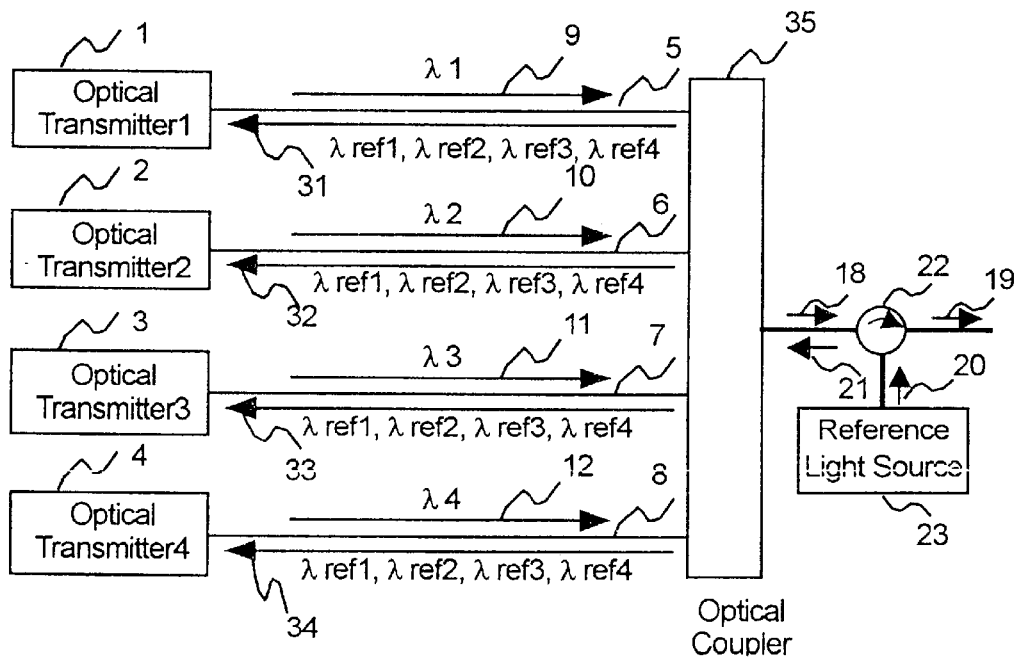
FIG. 4 is a diagram illustrating a configuration of an embodiment 2 of the present invention.

FIG. 4 is a diagram showing a configuration of another embodiment of an optical transmitting apparatus according to the present invention. Optical transmitters 1, 2, 3 and 4, optical fibers 5 through 8, light signals 9 through 12, an optical circulator 22 and a reference light source 23 are those similar to those shown in FIG. 1 and are also identical in operation to those shown in FIG. 1. The present embodiment is one in which the optical multiplexer 17 is replaced by an optical coupler 35 as compared with the first embodiment shown in FIG. 1. Since the optical coupler 35 does not include wavelength selectivity in multiplex and demultiplex operations, a reference wavelength light signal 21 is equally distributed to the optical fibers 5 through 8 on the input side.

Thus, the reference light source 23 superimposes an intrinsic identification signal on each of wavelengths λref1 through λref4. Each of the optical transmitters selects only one of the wavelengths λref1 through λref4 to be controlled, based on the intrinsic identification signal. For example, a method of intensity-modulating each individual reference light signals having the wavelengths λref1 through λref4, based on low-frequency waves different in frequency can be used as a method of superimposing the intrinsic identification signal thereon. Each of the optical transmitters 1 through 4 selects the wavelength having the identification signal inherent in its own optical transmitter from the wavelengths λref1 through λref4 included in reference wavelength light signals 31 through 34. Thereafter, the optical transmitters cause wavelengths of their light sources to coincide with one another or perform such wavelength control as to fix the wavelengths with predetermined offsets. Incidentally, the reference wavelength light signals having the wavelengths λref1 through λref4 emitted from the reference light source 23 may be sent out four simultaneously or may be sent out every predetermined time intervals and in time sequence.

While the four optical transmitters are shown in FIG. 4, no limitation is imposed on the number of optical transmitters. Further, the embodiment shown in FIG. 4 shows an example in which the optical fibers are used when the optical transmitters 1 through 4 and the optical coupler 35, and the optical coupler 35 and the reference light source 23 are respectively connected to one another. However, substances (including even those in air) capable of transmitting light signals can also be used for their interconnection without being limited to the optical fibers.

<Embodiment 3>

Figure 5:
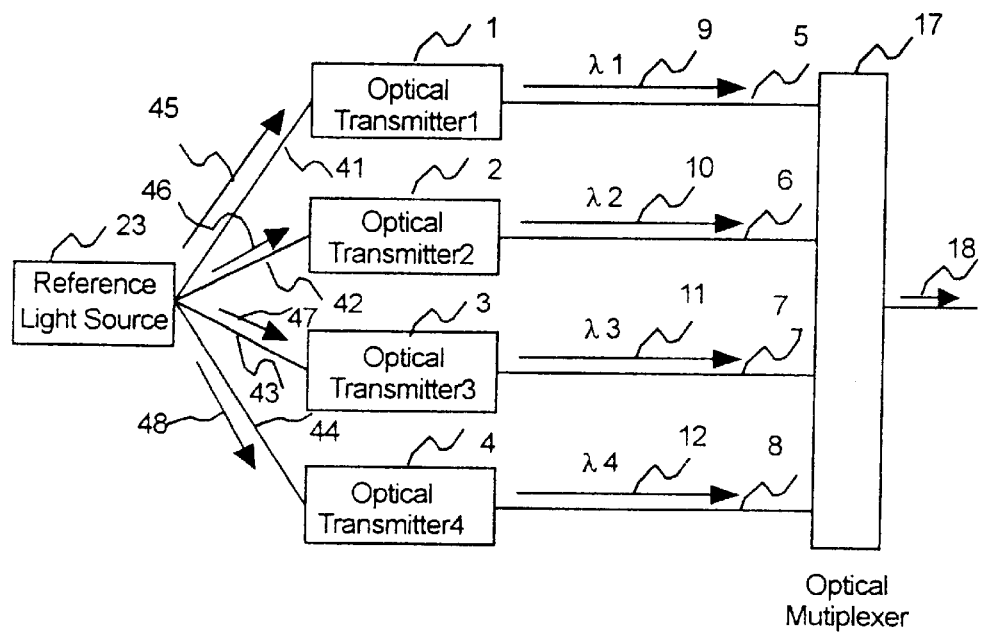
FIG. 5 is a diagram depicting a configuration of an embodiment 3 of the present invention.
Figure 9:
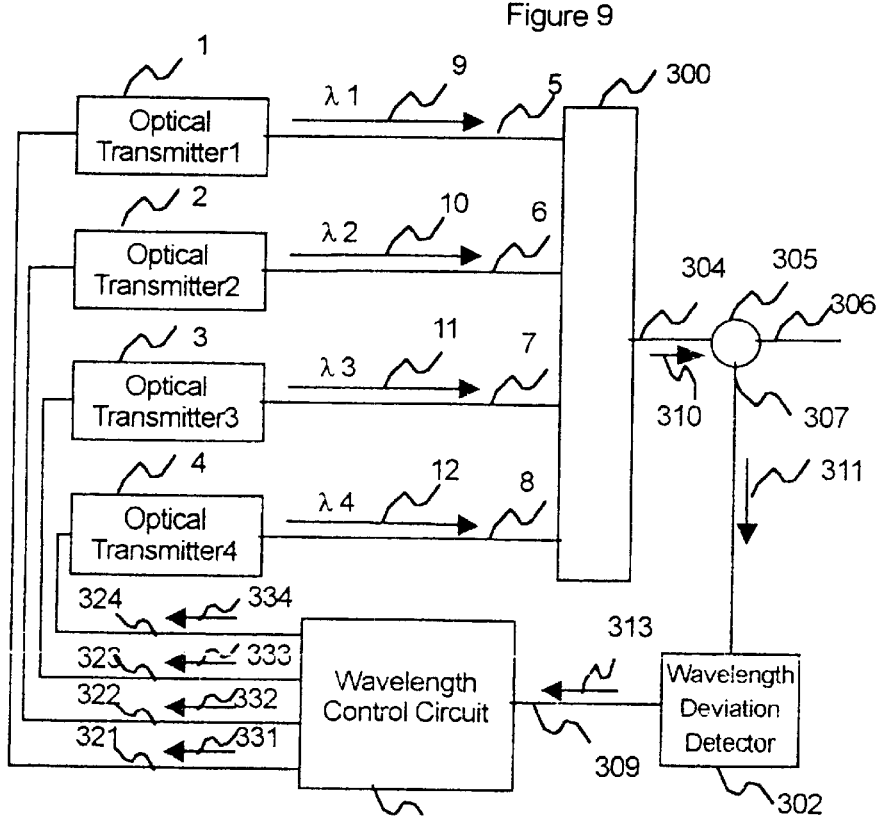
FIG. 9 is a diagram showing a configuration of a conventional optical transmitting apparatus.

FIG. 5 is a diagram showing a configuration of a further embodiment of an optical transmitting apparatus according to the present invention. Optical transmitters 1 through 4, optical fibers 5 through 8, light signals 9 through 12, and an optical multiplexer 17 are substantially identical in configuration and operation to those identified by the same reference numerals in FIG. 1. In the present embodiment, a reference light source 23 is directly connected to the respective optical transmitters 1 through 4 by optical fibers 41 through 44 respectively. The reference light source 23 generates reference wavelength light signals 45 through 48 corresponding to the respective optical transmitters 1 through 4 and transmits them to the optical transmitters 1 through 4 through the optical fibers 41 through 44 respectively. The optical transmitters 1 through 4 perform such waveform control as described in FIG. 6.

Figure 6:
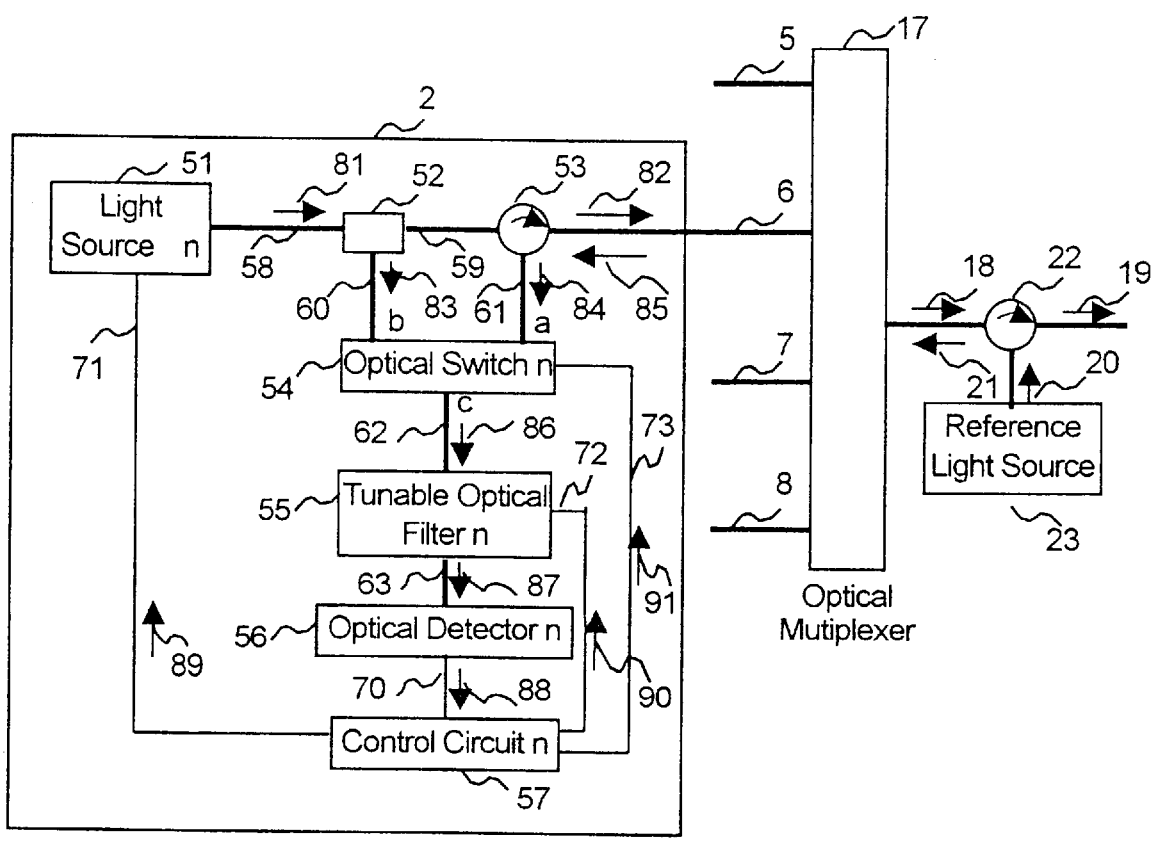
FIG. 6 is a diagram showing an example of a configuration of one of optical transmitters 1 through 4 employed in the embodiments 1 through 3.

FIG. 6 is a diagram showing an example of a configuration of one of the optical transmitters 1 through 4 employed in the embodiments 1, 2 and 3. A light signal 81 emitted from a light source 51 is launched into an optical power divider 52 through an optical fiber 58. The optical power divider 52 sends most of the light signal launched therein to an optical circulator 53 through an optical fiber 59. The optical power divider 52 delivers part thereof as a light signal 83 through an optical fiber 60 so as to be sent to an input port b of an optical switch 54. The light signal transmitted to the optical circulator is sent to one input port of the optical multiplexer 17 with a low loss as a light signal 82.

On the other hand, a reference wavelength light signal 85 sent from the reference light source 23 through the optical circulator 22 and the optical multiplexer 17 is transmitted to an input port a of the optical switch 54 through an optical fiber 61 with a low loss by the optical circulator 53. An outgoing port c of the optical switch 54 is connected to a tunable optical filter 55.

The tunable optical filter 55 can make use of a tunable optical filter or the like which scans an acousto-optic wavelength tunable filter or a dielectric multilayered filter on a mechanical or temperature basis. A light signal 86 is launched into the tunable optical filter 55 and thereafter enters an optical detector 56 through an optical fiber 63 as a light signal 87.

An electric signal 88 photoelectrically-converted by the optical detector 56 is sent to a control circuit 57. The control circuit 57 generates a signal 91 for controlling the optical switch 54 and a signal 90 for controlling the tunable optical filter 55. Further, the control circuit 57 also generates a signal 89 for controlling the wavelength of the light source 51. A signal for varying an operation temperature of the light source, a signal for controlling an operating current of the light source, etc. can be utilized as the signal 89 for controlling the wavelength of the light source.

Incidentally, substances (including even those in air) capable of transmitting light signals can be utilized as optical transmission lines given by the optical fibers in the drawing.

The operation of allowing the wavelength of the light source to coincide with the reference wavelength under the configuration shown in FIG. 6 will be explained with reference to FIG. 7.

(1) The control circuit 57 first sends a control signal 91 to the optical switch 54 so as to allow the connection of the input port a and the outgoing port c of the optical switch 54 shown in FIG. 6.

(2) In doing so, a reference wavelength light signal having a wavelength λref is inputted to the tunable optical filter 55.

(3) Here, the control circuit 57 sends a control signal 90 for controlling a transmission wavelength of the tunable optical filter 55 to maximize, for example, a current value of an electric signal 88 which is transmitted through the tunable optical filter 55 and subjected to optical power/current conversion by the optical detector 56.

(4) Next, the control circuit 57 sends a control signal 91 to the optical switch 54 so that the input port b and the output port c of the optical switch 54 are connected to one another.

(5) In doing so, a light signal having a wavelength λn, which is emitted from the light source 51, is inputted to the tunable optical filter 55.

(6) Here, the control circuit 57 sends a control signal 89 for controlling the wavelength of the light source 51 to maximize an electric signal 88, which is transmitted through the tunable optical filter 55 and photoelectrically-converted by the optical detector 56.

(7) Owing to a series of operations described in the paragraphs (1) through (6), the wavelength λn of the light source 51 coincides with the reference wavelength λref n.

The control circuit 57 performs the series of operations at all times or at predetermined intervals to allow the wavelength of the light source to always coincide with the reference wavelength.

Figure 7:
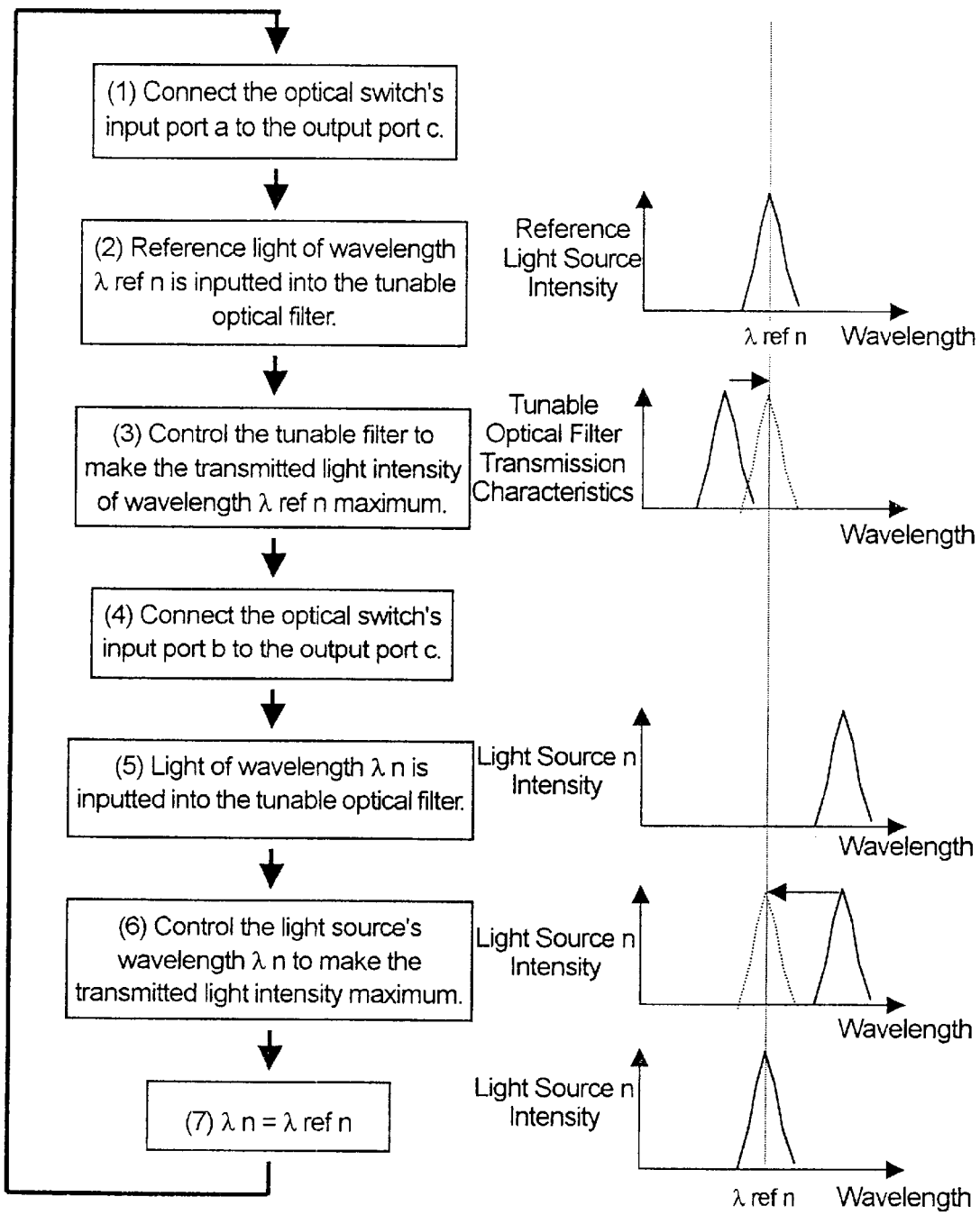
FIG. 7 is a diagram for describing one example of control operations of the optical transmitters 1 through 4 employed in the embodiments 1 through 3.
Figure 8:
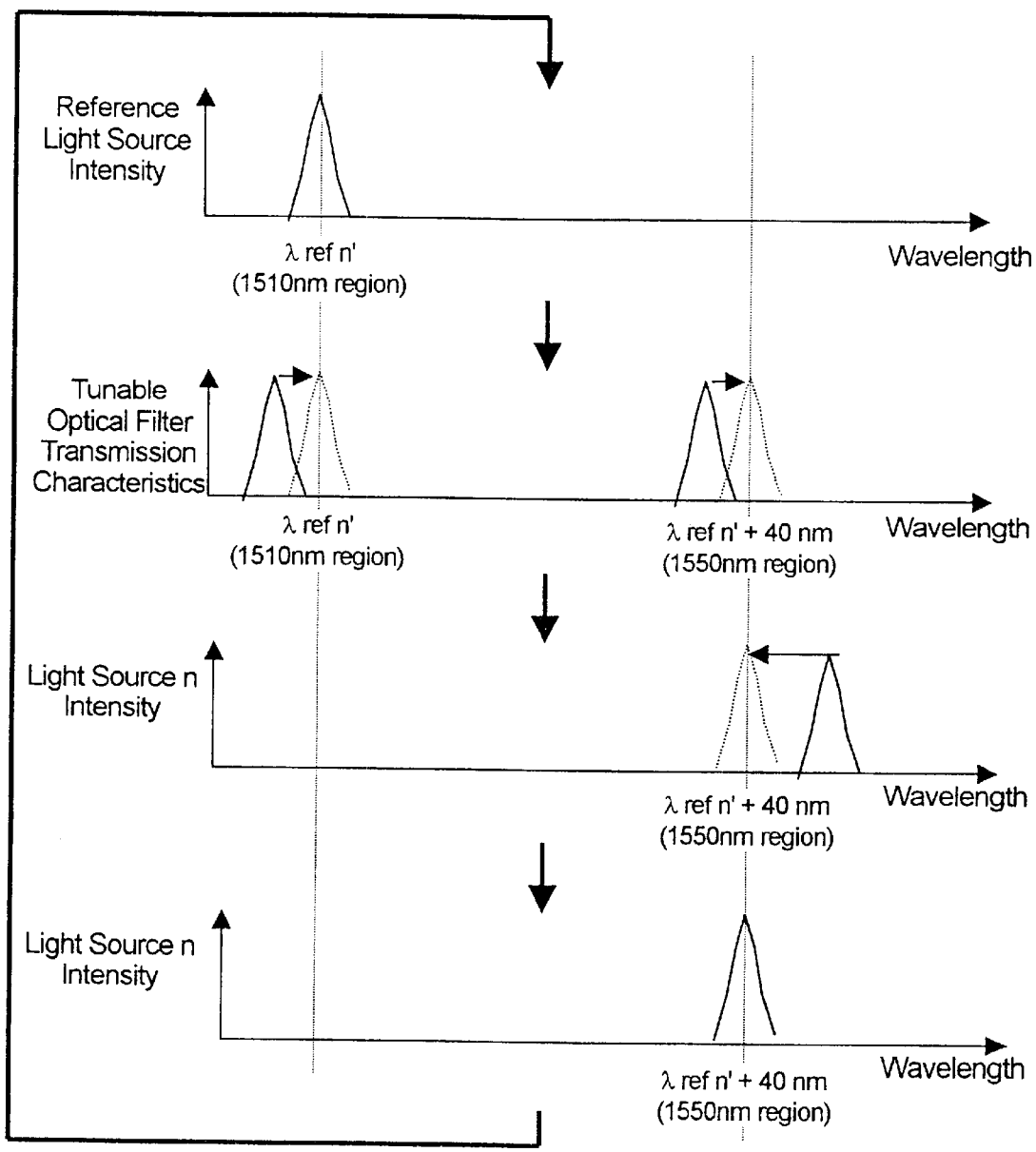
FIG. 8 is a diagram for describing one example of other control operations of the optical transmitters 1 through 4 employed in the embodiments 1 through 3.

The operation of allowing the reference wavelength and the wavelength of the light source to coincide with each other has been described in FIG. 7. However, the reference wavelength and the wavelength of the light source may also be stabilized while a predetermined waveform offset is being held. This case will be described with reference to FIG. 8. FIG. 8 is basically identical in operation to FIG. 7. Further, the optical transmitting apparatus is also similar in configuration to that shown in FIG. 6. The operation shown in FIG. 8 is different from that shown in FIG. 7 in terms of transmission wavelength characteristics of the tunable optical filter 55.

While only one intrinsic wavelength is used as the transmission wavelength of the tunable optical filter 55 in FIG. 7, the transmission wavelength of the tunable optical filter 55, which is suitable for the operation of FIG. 8, is one having a cyclic or periodic transmission characteristic. As one example, may be mentioned, for example, Fabry-Perot etalon wherein both sides of a cylinder of quartz glass are coated with reflecting films. When Fabry-Perot etalon in which the length of the cylinder of the quartz glass is 50 microns, for example, is fabricated, a transmission wavelength characteristic thereof results in one having transmission peaks every about 40 nm.

If Fabry-Perot etalon is now created and controlled so that one of the transmission peaks assumes a 1550 nm bandwidth or region often used for optical transmission, then adjacent transmission wavelength peaks result in a 1510 nm region and 1590 nm region. The operation of the optical transmitting apparatus will now be described using FIG. 8 with the reference wavelength as the 1510 nm region by way of example.

In a manner similar to FIG. 7, the transmission wavelength of Fabry-Perot etalon is first controlled in such a manner that the reference wavelength transmitted through the Fabry-Perot etalon is brought to the maximum. As this control method, may be utilized a method of controlling the temperature of the Fabry-Perot etalon, etc. Upon such control, a transmission peak of a 1550 nm region also varies by the same one as the quantity of a variation in the transmission peak of the 1510 nm region. This is because the amount of change or displacement of an interval between the transmission peaks is extremely small as compared with the amount of change or displacement of the transmission wavelength in the characteristic of the Fabry-Perot etalon.

Next, the wavelength of the light source is controlled so as to coincide with it corresponding transmission peak placed on the long-wave side, which is spaced away 40 nm from the reference wavelength λref n'.

The wavelength of the light source is stabilized by this operation so as to have the reference wavelength and a predetermined wavelength offset (40 nm in the example shown in FIG. 8).

While the embodiments according to the present invention have been described above, the present invention is not necessarily limited to the embodiments. The respective embodiments respectively show the case in which the optical transmitters are provided four. However, the number of the optical transmitters is not limited. Further, the embodiments respectively show the example in which the optical fibers are used to connect the optical transmitters and the optical multiplexer, and the optical multiplexer and the reference light source to one another. However, substances (including even those in air) capable of transmitting light signals can also be used for their interconnection without limitations being imposed on the optical fibers.

Further, no limitations are imposed only on the examples shown in FIGS. 1, 4 and 5 as means for distributing a reference wavelength light signal emitted from a reference light source. For instance, optical circulators are inserted in the course of the optical fibers 5 through 8 and a reference wavelength light signal may be distributed to the optical transmitters through the optical circulators. Namely, no reference is made to means for optically connecting the reference wavelength light signal generated from the reference light source to each optical transmitter.

In the present invention as described above, there is no need to superimpose information other than information necessary for information transfer on light signals transmitted from each individual optical transmitters. Therefore, the quality of transmission of each transmitted light signal is improved. Further, each individual optical transmitters and their corresponding external devices are respectively connected to one another by optical transmission lines (optical fibers or the like) alone, and no electrical connections are required for wavelength control. Therefore, even when a single optical transmitter is replaced by another due to its trouble or the like, it does not exert an influence on other normal optical transmitters. Further, since no optical device whose wavelength is fixed, is installed within each optical transmitter, the wavelength can be controlled to free wavelengths within a wavelength tunable region of a tunable laser when the tunable laser is used as a light source. Thus, the use of the present invention allows construction of a wavelength stabilized optical transmitting apparatus in which the quality of transmission is high, high reliability is provided and the degree of freedom of each set wavelength is high, and an optical transmission system including the wavelength stabilized optical transmitting apparatus.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A wavelength stabilized light source, comprising:

first and second light sources different in oscillation wavelength from each other;

first and second control means for respectively controlling wavelengths oscillated from said first and second light sources; and a reference light source for generating first and second reference wavelength signal lights used as references for the oscillation wavelengths of said first and second light sources, wherein said first control means receives a signal light emitted from said first light source and the first reference wavelength signal light therein, and thereafter first detects an oscillation wavelength of the first reference wavelength signal light and next controls an oscillation wavelength of said first light source so as to be maintained at a predetermined wavelength, based on the detected oscillation wavelength, said second control means receives a signal light emitted from said second light source and the second reference wavelength signal light therein, and thereafter first detects an oscillation wavelength of the second reference wavelength signal light and next controls an oscillation wavelength of said second light source so as to be maintained at a predetermined wavelength, based on the detected oscillation wavelength, and wherein upon detection of the oscillation frequencies of the first and second reference wavelength signal lights, transmittivity of a tunable optical filter is controlled so as to maximize an electric output which is transmitted through the tunable optical filter and photoelectrically converted by an optical detector.

2. The wavelength stabilized light source according to claim 1, further including means for controlling the oscillation wavelength of said first or second light source so as to coincide with a wavelength transmitted through the tunable optical filter or controlling the oscillation wavelength of said first or second light source so as to have a predetermined offset with respect to the transmitted wavelength after the transmittivity has been controlled to a predetermined value.

3. The wavelength stabilized light source according to claim 2, further including control means for operating the control on the transmittivity and the control on the oscillation wavelengths of said light sources of predetermined time intervals.

4. A wavelength stabilized light source, comprising:

first and second light sources different in oscillation wavelength from each other;

first and second control means for respectively controlling wavelengths oscillated from said first and second light sources; and a reference light source for generating first and second reference wavelength signal lights used as references for the oscillation wavelengths of said first and second light sources; and wherein said first control means receives a signal light emitted from said first light source and the first and second reference wavelength signal lights therein, and thereafter first detects an oscillation wavelength of the first reference wavelength signal light and next controls the oscillation wavelength of said first light source so as to be maintained at a predetermined wavelength, based on the detected oscillation wavelength, and said second control means receives a signal light emitted from said second light source and the first and second reference wavelength signal light therein, and thereafter first detects an oscillation wavelength of the second reference wavelength signal light and next controls the oscillation wavelength of said second light source so as to be maintained at a predetermined wavelength, based on the detected oscillation wavelength.

5. The wavelength stabilized light source according to claim 4, wherein upon detection of the oscillation frequencies of the first and second reference wavelength signal lights, transmittivity of a tunable optical filter is controlled so as to maximize an electric output which is transmitted through the tunable optical filter and photoelectrically converted by an optical detector.

6. The wavelength stabilized light source according to claim 4, further including means for controlling the oscillation wavelength of said first or second light source so as to coincide with a wavelength transmitted through the tunable optical filter or controlling the oscillation wavelength of said first or second light source so as to have a predetermined offset with respect to the transmitted wavelength after the transmittivity has been controlled to a predetermined value.

7. The wavelength stabilized light source according to claim 6, further including control means for repeating the control on the transmittivity and the control on the oscillation wavelengths of said light sources at predetermined times intervals.

8. A wavelength stabilized light source, comprising:

first and second light sources different in oscillation wavelength from each other;

first and second optical wavelengths;

first and second control means for respectively controlling wavelengths oscillated from said first and second light sources; and a reference light source for generating first and second reference wavelength signal lights used as references for the oscillation wavelengths of said first and second light sources; and wherein first and second signal lights emitted from said first and second light sources are multiplexed by an optical multiplexer, followed by transmission to the outside through a third optical waveguide, the first reference wavelength signal light is inputted to the third optical waveguide and selected by the optical multiplexer so as to reach said first control means positioned in each location caused to branch off from a first optical waveguide interposed between said first light source and said optical multiplexer, and part of the first signal light also branches off from the first optical waveguide so as to reach said first control means, and the second reference wavelength signal light is inputted to the third optical waveguide and selected by the optical multiplexer so as to reach said second control means positioned in each location caused to branch off from a second optical waveguide interposed between said second light source and said optical multiplexer, and part of the second signal light also branches off from the second optical waveguide so as to reach said second control means, said first control means receives the signal light emitted from said first light source and the first reference wavelength signal light therein, and thereafter first detects an oscillation wavelength of the first reference wavelength signal light and next controls the oscillation wavelength of said first light source so as to be maintained at a predetermined wavelength, based on the detected oscillation wavelength, and said second control means receives the signal light emitted from said second light source and the second reference wavelength signal light therein, and thereafter first detects an oscillation wavelength of the second reference wavelength signal light and next controls the oscillation wavelength of said second light source so as to be maintained at a predetermined wavelength, based on the detected oscillation wavelength.

9. The wavelength stabilized light source according to claim 8, wherein upon detection of the oscillation wavelengths of the first and second reference wavelength signal lights, transmittivity of a tunable optical filter is controlled so as to maximize an electric output which is transmitted through the tunable optical filter and photoelectrically converted by an optical detector.

10. The wavelength stabilized light source according to claim 9, further including means for controlling the oscillation wavelength of said first or second light source so as to coincide with a wavelength transmitted through the tunable optical filter or controlling the oscillation wavelength of said first or second light source so as to have a predetermined offset with respect to the transmitted wavelength after the transmittivity has been controlled to a predetermined value.

11. The wavelength stabilized light source according to claim 10, further including control means for repeating the control on the transmittivity and the control on the oscillation wavelengths of said light sources at predetermined times intervals.

12. A wavelength stabilized light source, comprising:
first and second light sources different in oscillation wavelength from each other;
first and second optical waveguides;
first and second control means for respectively controlling wavelengths oscillated from said first and second light sources; and
a reference light source for generating first and second reference wavelength signal lights used as references for the oscillation wavelengths of said first and second light sources; and wherein first and second signal lights emitted from said first and second light sources are multiplexed by an optical coupler, followed by transmission to the outside through a third optical waveguide, the first and second reference wavelength signal lights are inputted to the third optical waveguide so as to reach said first and second control means positioned in locations caused to respectively branch off from first and second optical waveguides interposed between said first and second light sources and said optical coupler through said optical coupler, and parts of the first and second signal lights also branch off from the first and second optical waveguides so as to reach said first and second control means respectively, said first control means receives the signal light emitted from said first light source and the first reference wavelength signal light therein, and thereafter first detects an oscillation wavelength of the first reference wavelength signal light and next controls the oscillation wavelength of said first light source so as to be maintained at a predetermined wavelength, based on the detected oscillation wavelength, and said second control means receives the signal light emitted from said second light source and the second reference wavelength signal light therein, and thereafter first detects an oscillation wavelength of the second reference wavelength signal light and next controls the oscillation wavelength of said second light source so as to be maintained at a predetermined wavelength, based on the detected oscillation wavelength.

13. The wavelength stabilized light source according to claim 12, wherein upon detection of the oscillation wavelengths of the first and second reference wavelength signal lights, transmittivity of a tunable optical filter is controlled so as to maximize an electric output which is transmitted through the tunable optical filter and photoelectrically converted by an optical detector.

14. The wavelength stabilized light source according to claim 13, further including means for controlling the oscillation wavelength of said first or second light source so as to coincide with a wavelength transmitted through the tunable optical filter or controlling the oscillation wavelength of said first or second light source so as to have a predetermined offset with respect to the transmitted wavelength after the transmittivity has been controlled to a predetermined value.

15. The wavelength stabilized light source according to claim 14, further including control means for repeating the control on the transmittivity and the control on the oscillation wavelengths of said light sources at predetermined times intervals.

16. A wavelength stabilized light source comprising:
first and second light sources different in oscillation wavelength from each other;
first and second optical waveguides;
first and second control means for respectively controlling wavelengths oscillated from said first and second light sources;
a reference light source for generating first and second reference wavelength signal lights used as references for the oscillation wavelengths of said first and second light sources;
wherein first and second signal lights emitted from said first and second light sources are multiplexed by an optical coupler, followed by transmission to the outside through a third optical waveguide, the first reference wavelength signal light reaches said first control means and the second reference wavelength signal light reaches said second control means, said first control means receives the signal light emitted from said first light source and the first reference wavelength signal light therein, and thereafter first detects an oscillation wavelength of the first reference wavelength signal light and next controls the oscillation wavelength of said first light source so as to be maintained at a predetermined wavelength, based on the detected oscillation wavelength, said second control means receives the signal light emitted from said second light source and the second reference wavelength signal light therein, and thereafter first detects an oscillation wavelength of the second reference wavelength signal light and next controls the oscillation wavelength of said second light source so as to be maintained at a predetermined wavelength, based on the detected oscillation wavelength, and wherein upon detection of the oscillation wavelengths of the first and second reference wavelength signal lights, transmittivity of a tunable optical filter is controlled so as to maximize an electric output which is transmitted through the tunable optical filter and photoelectrically converted by an optical detector.

17. The wavelength stabilized light source according to claim 16, further including means for controlling the oscillation wavelength of said first or second light source so as to coincide with a wavelength transmitted through the tunable optical filter or controlling the oscillation wavelength of said first or second light source so as to have a predetermined offset with respect to the transmitted wavelength after the transmittivity has been controlled to a predetermined value.

18. The wavelength stabilized light source according to claim 17, further including control means for repeating the control on the transmittivity and the control on the oscillation wavelengths of said light sources at predetermined time intervals.

* * * * *